(12) United States Patent
Shim

(10) Patent No.: US 7,846,057 B2
(45) Date of Patent: Dec. 7, 2010

(54) POWER TRAIN OF AUTOMATIC TRANSMISSION

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/781,563

(22) Filed: May 17, 2010

(65) Prior Publication Data

US 2010/0227731 A1    Sep. 9, 2010

Related U.S. Application Data

(62) Division of application No. 11/590,206, filed on Oct. 31, 2006, now Pat. No. 7,727,104.

(30) Foreign Application Priority Data

Jul. 20, 2006    (KR) ..................... 10-2006-0068026

(51) Int. Cl.
*F16H 3/62* (2006.01)
(52) U.S. Cl. ..................................... 475/275
(58) Field of Classification Search ...................... None
See application file for complete search history.

(56) References Cited

U.S. PATENT DOCUMENTS

| | | | |
|---|---|---|---|
| 4,719,985 A * | 1/1988 | Zaiser | 180/245 |
| 5,755,637 A * | 5/1998 | Park | 475/275 |
| 6,217,474 B1 | 4/2001 | Ross et al. | |
| 6,729,993 B2 | 5/2004 | Bucknor et al. | |
| 6,752,738 B1 * | 6/2004 | Martin et al. | 475/276 |
| 7,192,378 B2 | 3/2007 | Raghavan et al. | |

* cited by examiner

*Primary Examiner*—Dirk Wright
(74) *Attorney, Agent, or Firm*—Morgan, Lewis & Bockius LLP

(57) ABSTRACT

A power train of an automatic transmission with eight forward speeds and two reverse speeds includes: a speed reduction unit including a first variable input member connected to an input shaft via a first clutch, first and second variably stopped members connected to a transmission case, and a reduced speed output member; an output unit including a reduced speed input member connected to the reduced speed output member, second and third variable input members connected to the input shaft via second and third clutches, respectively, a third variably stopped member connected to the transmission case, and a shifted speed output member connected to an output gear. A first brake variably stops the third variable stopped member; a second brake variably stops the first variable stopped member; and a third brake variably stops the second variable stopped member.

13 Claims, 10 Drawing Sheets

FIG.17

| shift speed | C1 | C2 | C3 | B1 | B2 | B3 | F1 | speed ratio | step ratio of speed ratio |
|---|---|---|---|---|---|---|---|---|---|
| D1 |  | ● |  | ○ |  | ● | ● | 3.769 |  |
| D2 |  | ● |  |  | ● | ● |  | 2.170 | 1.737 |
| D3 | ● | ● |  |  | ● |  |  | 1.1528 | 1.420 |
| D4 | ● | ● |  |  |  | ● |  | 1.212 | 1.260 |
| D5 | ● | ● | ● |  |  |  |  | 1.000 | 1.212 |
| D6 | ● |  | ● |  |  | ● |  | 0.808 | 1.238 |
| D7 | ● |  | ● |  | ● |  |  | 0.681 | 1.187 |
| D8 |  |  | ● |  | ● | ● |  | 0.577 | 1.179 |
| REV.1 | ● |  |  | ● | ● |  |  | -3.804 | 6.528 |
| REV.2 | ● |  |  | ● |  | ● |  | -2.023 |  |

● Shift elements closed

FIG.18

| shift speed | C1 | C2 | C3 | B1 | B2 | B3 | F1 | speed ratio | step ratio of speed ratio |
|---|---|---|---|---|---|---|---|---|---|
| D1 |  | ● |  | ○ |  | ● | ● | 3.880 |  |
| D2 |  | ● |  |  | ● | ● |  | 2.293 | 1.692 |
| D3 | ● | ● |  |  | ● |  |  | 1.613 | 1.422 |
| D4 | ● | ● |  |  |  | ● |  | 1.228 | 1.313 |
| D5 | ● | ● | ● |  |  |  |  | 1.000 | 1.228 |
| D6 | ● |  | ● |  |  | ● |  | 0.788 | 1.268 |
| D7 | ● |  | ● |  | ● |  |  | 0.646 | 1.221 |
| REV.1 | ● |  |  | ● | ● |  |  | -3.763 | 6.009 |
| REV.2 | ● |  |  | ● |  | ● |  | -1.831 |  |

● Shift elements closed

POWER TRAIN OF AUTOMATIC TRANSMISSION

CROSS-REFERENCE TO RELATED APPLICATION

This application claims priority to and the benefit of U.S. patent application Ser. No. 11/590,206, filed Oct. 31, 2006, and Korean Patent Application No. 10-2006-0068026 filed in the Korean Intellectual Property Office on Jul. 20, 2006, the entire contents of which are incorporated herein by reference.

BACKGROUND OF THE INVENTION (a) Field of the Invention

The present invention relates to a power train of an automatic transmission. More particularly, the present invention relates to a power train of an automatic transmission with eight forward speeds and two reverse speeds.

(b) Description of the Related Art

A typical shift mechanism of an automatic transmission utilizes a combination of planetary gear sets. A power train of such an automatic transmission changes rotating speed and torque received from a torque converter of the automatic transmission, and accordingly changes and transmits the changed torque to an output shaft.

When a transmission utilizes a relatively large number of shift speeds, speed ratios of the transmission can be optimally designed, and therefore a vehicle can have better fuel mileage and better performance than those with fewer shift speeds.

In addition, features of a power train such as durability, efficiency in power transmission, and size depend a lot on the layout of combined planetary gear sets.

A manual transmission with many speeds causes the inconvenience of excessively frequent shifting operations by the driver. Therefore, transmissions with large numbers of shift-speeds lend themselves to automatic transmissions.

In addition, as more speeds are utilized, a power train that can easily skip up-shift and skip down-shift as well as normally up-shift and down-shift is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a power train of an automatic transmission with eight forward speeds and two reverse speeds. The power train easily skip up-shifts and skip down-shifts.

A power train of an automatic transmission according to exemplary embodiments of the present invention includes: an input shaft; an output gear; a transmission case; a speed reduction unit including a first variable input member that is variably connected to the input shaft, first and second variable stopped members that are variably stopped by being variably connected to the transmission case, and a reduced speed output member that outputs first and second reduced rotational speeds; an output unit including a reduced speed input member that is fixedly connected to the reduced speed output member, second and third variable input members that are variably connected to the input shaft, a third variable stopped member that is variably stopped by being variably connected to the transmission case, and a shifted speed output member that always acts as an output element by being fixedly connected to the output gear. The output unit generates eight forward speeds and two reverse speeds at the shifted speed output member by operations of the reduced speed input member, the second and third variable input members, and the third variable stopped member; a first clutch for variably connecting the first variable input member to the input shaft. The power train further includes a second clutch for variably connecting the second variable input member to the input shaft; a third clutch for variably connecting the third variable input member to the input shaft; a first brake for variably stopping the third variable stopped member; a second brake for variably stopping the first variable stopped member; and a third brake for variably stopping the second variable stopped member.

In addition, some embodiments of the present invention further include a one-way clutch disposed between the third variable stopped member and the transmission case in parallel with the first brake.

According to a first exemplary embodiment of the present invention, the speed reduction unit includes: a first planetary gear set having a first sun gear, a first planet carrier, and a first ring gear; and a second planetary gear set having a second sun gear, a second planet carrier, and a second ring gear, wherein the second sun gear is the first variable input member, the first planet carrier is the first variable stopped member, the first sun gear is the second variable stopped member, the first ring gear and the second planet carrier are fixedly connected to each other and act as the reduced speed output member, and the first planet carrier is fixedly connected to the second ring gear.

The output unit may include: a third planetary gear set having a third sun gear, a third planet carrier, and a third ring gear; and a fourth planetary gear set having a fourth sun gear, a fourth planet carrier, and a fourth ring gear, wherein the third ring gear is the reduced speed input member, the fourth sun gear is the second variable input member, the third planet carrier is the third variable input member, the fourth ring gear is the third variable stopped member, the fourth planet carrier is the shifted speed output member, the third planet carrier is fixedly connected to the fourth ring gear, and the third sun gear is fixedly connected to the fourth sun gear.

The first, second, third, and fourth planetary gear sets may be disposed in a sequence of the first planetary gear set, the second planetary gear set, the third planetary gear set, and the fourth planetary gear set.

According to a second exemplary embodiment of the present invention, the speed reduction unit includes: a first planetary gear set having a first sun gear, a first planet carrier, and a first ring gear; and a second planetary gear set having a second sun gear, a second planet carrier, and a second ring gear, wherein the second ring gear is the first variable input member, the first planet carrier is the first variable stopped member, the first sun gear is the second variable stopped member, the first ring gear is the reduced speed output member, the first ring gear is fixedly connected to the second planet carrier, and the first sun gear is fixedly connected to the second sun gear.

The output unit may include: a third planetary gear set having a third sun gear, a third planet carrier, and a third ring gear; and a fourth planetary gear set having a fourth sun gear, a fourth planet carrier, and a fourth ring gear, wherein the third sun gear is operated as the reduced speed input member, the fourth sun gear is operated as the second variable input member, the third planet carrier and the fourth ring gear are fixedly connected to each other and are operated as the third variable input member, the third planet carrier is operated as the third variable stopped member, and the third ring gear and the fourth planet carrier are fixedly connected to each other and act as the shifted speed output member.

The first, second, third, and fourth planetary gear sets may be disposed in a sequence of the first planetary gear set, the second planetary gear set, the third planetary gear set, and the fourth planetary gear set.

The speed reduction unit of the third exemplary embodiment may be the same as the speed reduction unit of the first exemplary embodiment.

According to the third exemplary embodiment of the present invention, the output unit may include: a third planetary gear set having a third sun gear, a third planet carrier, and a third ring gear; and a fourth planetary gear set having a fourth sun gear, a fourth planet carrier, and a fourth ring gear, wherein the third sun gear is the reduced speed input member, the fourth sun gear is the second variable input member, the third planet carrier and the fourth ring gear are fixedly connected to each other and act as the third variable input member, the third planet carrier is the third variable stopped member, and the third ring gear and the fourth planet carrier are fixedly connected to each other and act as the shifted speed output member.

The first, second, third, and fourth planetary gear sets may be disposed in a sequence of the first planetary gear set, the second planetary gear set, the third planetary gear set, and the fourth planetary gear set.

The speed reduction unit of the fourth exemplary embodiment may be the same as the speed reduction unit of the second exemplary embodiment.

According to the fourth exemplary embodiment of the present invention, the output unit may include: a third planetary gear set having a third sun gear, a third planet carrier, and a third ring gear; and a fourth planetary gear set having a fourth sun gear, a fourth planet carrier, and a fourth ring gear, wherein the third ring gear is the reduced speed input member, the fourth sun gear is the second variable input member, the third planet carrier is the third variable input member, the fourth ring gear is the third variable stopped member, the fourth planet carrier is the shifted speed output member, the third planet carrier is fixedly connected to the fourth ring gear, and the third sun gear is fixedly connected to the fourth sun gear.

The first, second, third, and fourth planetary gear sets may be disposed in a sequence of the first planetary gear set, the second planetary gear set, the third planetary gear set, and the fourth planetary gear set.

The speed reduction unit of the fifth exemplary embodiment may be the same as the speed reduction unit of the second exemplary embodiment.

According to the fifth exemplary embodiment of the present invention, the output unit may include: a third planetary gear set having a third sun gear, a third planet carrier, and a third ring gear; and a fourth planetary gear set having a fourth sun gear, a fourth planet carrier, and a fourth ring gear, wherein the third ring gear is the reduced speed input member, the fourth sun gear is the second variable input member, the third planet carrier is the third variable input member, the fourth ring gear is the third variable stopped member, the fourth planet carrier is the shifted speed output member, the third planet carrier is fixedly connected to the fourth ring gear, and the third sun gear is fixedly connected to the fourth planet carrier.

The first, second, third, and fourth planetary gear sets may be disposed in a sequence of the first planetary gear set, the second planetary gear set, the third planetary gear set, and the fourth planetary gear set.

The speed reduction unit of the sixth exemplary embodiment may be the same as the speed reduction unit of the second exemplary embodiment.

According to the sixth exemplary embodiment of the present invention, the output unit may include: a third planetary gear set having a third sun gear, a third planet carrier, and a third ring gear; and a fourth planetary gear set having a fourth sun gear, a fourth planet carrier, and a fourth ring gear, wherein the fourth ring gear is the reduced speed input member, the third sun gear is the second variable input member, the third ring gear is the third variable input member, the fourth planet carrier is the third variable stopped member, the fourth sun gear is the shifted speed output member, the third ring gear is fixedly connected to the fourth planet carrier, and the third planet carrier is fixedly connected to the fourth sun gear.

The first, second, third, and fourth planetary gear sets may be disposed in a sequence of the first planetary gear set, the second planetary gear set, the third planetary gear set, and the fourth planetary gear set.

According to the seventh exemplary embodiment of the present invention, the speed reduction unit may include: a first planetary gear set having a first sun gear, a first planet carrier, and a first ring gear; and a second planetary gear set having a second sun gear, a second planet carrier, and a second ring gear, wherein the second ring gear is the first variable input member, the first planet carrier is the first variable stopped member, the first sun gear is the second variable stopped member, the first ring gear is the reduced speed output member, the first ring gear is fixedly connected to the second planet carrier, and the first planet carrier is fixedly connected to the second sun gear.

The output unit may include: a third planetary gear set having a third sun gear, a third planet carrier, and a third ring gear; and a fourth planetary gear set having a fourth sun gear, a fourth planet carrier, and a fourth ring gear, wherein the third ring gear is the reduced speed input member, the fourth sun gear is the second variable input member, the third planet carrier is the third variable input member, the fourth ring gear is the third variable stopped member, the fourth planet carrier is the shifted speed output member, the third planet carrier is fixedly connected to the fourth ring gear, and the third sun gear is fixedly connected to the fourth planet carrier.

The first, second, third, and fourth planetary gear sets may be disposed in a sequence of the first planetary gear set, the second planetary gear set, the third planetary gear set, and the fourth planetary gear set.

According to the eighth exemplary embodiment of the present invention, the speed reduction unit may include a ravingneaux planetary gear set having a ravingneaux ring gear, a ravingneaux planet carrier, a long-pinion-side sun gear, and a short-pinion-side sun gear, wherein the short-pinion-side sun gear is the first variable input member, the ravingneaux planet carrier is the first variable stopped member, the long-pinion-side sun gear is the second variable stopped member, and the ravingneaux ring gear is the reduced speed output member.

The output unit may include: a first planetary gear set having a first sun gear, a first planet carrier, and a first ring gear; and a second planetary gear set having a second sun gear, a second planet carrier, and a second ring gear, wherein the first ring gear is the reduced speed input member, the second sun gear is the second variable input member, the first planet carrier is the third variable input member, the second ring gear is the third variable stopped member, the second planet carrier is the shifted speed output member, the first sun gear is fixedly connected to the second sun gear, and the first planet carrier is fixedly connected to the second ring gear.

The ravingneaux planetary gear set and the first and second planetary gear sets may be disposed in a sequence of the ravingneaux planetary gear set, the first planetary gear set, and the second planetary gear set.

According to the ninth exemplary embodiment of the present invention, the speed reduction unit may include a ravingneaux planetary gear set having a ravingneaux ring gear, a ravingneaux planet carrier, a long-pinion-side sun gear, and a short-pinion-side sun gear, wherein the long-pinion-side sun gear is the first variable input member, the ravingneaux planet carrier is the first variable stopped member, the short-pinion-side sun gear is the second variable stopped member, and the ravingneaux ring gear is the reduced speed output member.

The output unit may include: a first planetary gear set having a first sun gear, a first planet carrier, and a first ring gear; and a second planetary gear set having a second sun gear, a second planet carrier, and a second ring gear, wherein the first ring gear is the reduced speed input member, the second sun gear is the second variable input member, the first planet carrier is the third variable input member, the second ring gear is the third variable stopped member, the second planet carrier is the shifted speed output member, the first planet carrier is fixedly connected to the second ring gear, and the first sun gear is fixedly connected to the second sun gear.

The ravingneaux planetary gear set and the first and second planetary gear sets may be disposed in a sequence of the ravingneaux planetary gear set, the first planetary gear set, and the second planetary gear set.

The speed reduction unit of the tenth exemplary embodiment may be the same as the speed reduction unit of the eighth exemplary embodiment.

According to the tenth exemplary embodiment of the present invention, the output unit may include: a first planetary gear set having a first sun gear, a first planet carrier, and a first ring gear; and a second planetary gear set having a second sun gear, a second planet carrier, and a second ring gear, wherein the first sun gear is the reduced speed input member, the second sun gear is the second variable input member, the first planet carrier is the third variable input member, the first planet carrier and the second ring gear are fixedly connected to each other and act as the third variable stopped member, the second planet carrier is the shifted speed output member, and the first ring gear is fixedly connected to the second planet carrier.

The ravingneaux planetary gear set and the first and second planetary gear sets may be disposed in a sequence of the ravingneaux planetary gear set, the first planetary gear set, and the second planetary gear set.

The speed reduction unit of the eleventh exemplary embodiment may be the same as the speed reduction unit of the ninth exemplary embodiment.

According to the eleventh exemplary embodiment of the present invention, the output unit may include: a first planetary gear set having a first sun gear, a first planet carrier, and a first ring gear; and a second planetary gear set having a second sun gear, a second planet carrier, and a second ring gear, wherein the first sun gear is the reduced speed input member, the second sun gear is the second variable input member, the first planet carrier is the third variable input member, the first planet carrier and the second ring gear are fixedly connected to each other and act as the third variable stopped member, the second planet carrier is the shifted speed output member, and the first ring gear is fixedly connected to the second planet carrier.

The ravingneaux planetary gear set and the first and second planetary gear sets may be disposed in a sequence of the ravingneaux planetary gear set, the first planetary gear set, and the second planetary gear set.

The speed reduction unit of the twelfth exemplary embodiment may be the same as the speed reduction unit of the second exemplary embodiment.

According to the twelfth exemplary embodiment of the present invention, the output unit mau include a ravingneaux planetary gear set having a ravingneaux ring gear, a ravingneaux planet carrier, a long-pinion-side sun gear, and a short-pinion-side sun gear, wherein the long-pinion-side sun gear is the reduced speed input member, the ravingneaux planet carrier is the second variable input member, the short-pinion-side sun gear is the third variable input member, the ravingneaux planet carrier is the third variable stopped member, and the ravingneaux ring gear is the shifted speed output member.

The first and second planetary gear sets and the ravingneaux planetary gear set may be disposed in a sequence of the first planetary gear set, the second planetary gear set, and the ravingneaux planetary gear set.

The speed reduction unit of the thirteenth exemplary embodiment may be the same as the speed reduction unit of the first exemplary embodiment.

According to the thirteenth exemplary embodiment of the present invention, the output unit may include a ravingneaux planetary gear set having a ravingneaux ring gear, a ravingneaux planet carrier, a long-pinion-side sun gear, and a short-pinion-side sun gear, wherein the long-pinion-side sun gear is the reduced speed input member, the ravingneaux planet carrier is the second variable input member, the short-pinion-side sun gear is the third variable input member, the ravingneaux planet carrier is the third variable stopped member, and the ravingneaux ring gear is the shifted speed output member.

The first and second planetary gear sets and the ravingneaux planetary gear set may be disposed in a sequence of the first planetary gear set, the second planetary gear set, and the ravingneaux planetary gear set.

The speed reduction unit of the fourteenth exemplary embodiment may be the same as the speed reduction unit of the second exemplary embodiment.

According to the fourteenth exemplary embodiment of the present invention, the output unit may include a compound planetary gear set having a long-pinion-side ring gear, a short-pinion-side ring gear, a third planet carrier, and a third sun gear, wherein the long-pinion-side ring gear is the reduced speed input member, the third planet carrier is the second variable input member, the third sun gear is the third variable input member, the third planet carrier is the third variable stopped member, and the short-pinion-side ring gear is the shifted speed output member.

The first and second planetary gear sets and the compound planetary gear set may be disposed in a sequence of the first planetary gear set, the second planetary gear set, and the compound planetary gear set.

According to the fifteenth exemplary embodiment of the present invention, the speed reduction unit may include a first ravingneaux planetary gear set having a first ring gear, a first planet carrier, a first long-pinion-side sun gear, and a first short-pinion-side sun gear, wherein the first short-pinion-side sun gear is the first variable input member, the first planet carrier is as the first variable stopped member, the first long-pinion-side sun gear is the second variable stopped member, and the first ring gear is the reduced speed output member.

The output unit may include a second ravingneaux planetary gear set having a second ring gear, a second planet carrier, a second long-pinion-side sun gear, and a second short-pinion-side sun gear, wherein the second long-pinion-side sun gear is the reduced speed input member, the second planet carrier is the second variable input member, the second short-pinion-side sun gear is the third variable input member, the second planet carrier is the third variable stopped member, and the second ring gear is the shifted speed output member.

The first and second ravingneaux planetary gear sets may be disposed in a sequence of the first ravingneaux planetary gear set and the second ravingneaux planetary gear set.

According to the sixteenth exemplary embodiment of the present invention, the speed reduction unit may include a first ravingneaux planetary gear set having a first ring gear, a first planet carrier, a first long-pinion-side sun gear, and a first short-pinion-side sun gear, wherein the first long-pinion-side sun gear is the first variable input member, the first planet carrier is the first variable stopped member, the first short-pinion-side sun gear is the second variable stopped member, and the first ring gear is the reduced speed output member.

The output unit may include a second ravingneaux planetary gear set having a second ring gear, a second planet carrier, a second long-pinion-side sun gear, and a second short-pinion-side sun gear, wherein the second long-pinion-side sun gear is the reduced speed input member, the second planet carrier is the second variable input member, the second short-pinion-side sun gear is the third variable input member, the second planet carrier is the third variable stopped member, and the second ring gear is the shifted speed output member.

The first and second ravingneaux planetary gear sets may be disposed in a sequence of the first ravingneaux planetary gear set and the second ravingneaux planetary gear set.

According to exemplary embodiments of the present invention, the input shaft and the output gear may be disposed on the same side.

In addition, the first and third clutches may be disposed between the speed reduction unit and the output unit, and the second clutch may be disposed opposite the speed reduction unit with reference to the output unit.

In addition, the second and third brakes may be disposed opposite the first brake with reference to the speed reduction unit.

According to exemplary embodiments of the present invention: the second clutch, the third brake, and the one-way clutch are operated in a first forward speed; the second clutch and the second and third brakes are operated in a second forward speed; the first and second clutches and the second brake are operated in a third forward speed; the first and second clutches and the third brake are operated in a fourth forward speed; the first, second, and third clutches are operated in a fifth forward speed; the first and third clutches and the third brake are operated in a sixth forward speed; the first and third clutches and the second brake are operated in a seventh forward speed; the third clutch and the second and third brakes are operated in an eighth forward speed; the first clutch and the first and second brakes are operated in a first reverse speed; and the first clutch and the first and third brakes are operated in a second reverse speed.

BRIEF DESCRIPTION OF THE DRAWINGS

FIG. 17 is an operational chart for a power train of an automatic transmission with eight forward speeds and two reverse speeds according to exemplary embodiments of the present invention;

FIG. 18 is an operational chart for a power train of an automatic transmission with seven forward speeds and two reverse speeds according to exemplary embodiments of the present invention.

DETAILED DESCRIPTION OF THE PREFERRED EMBODIMENTS

Figure 1:
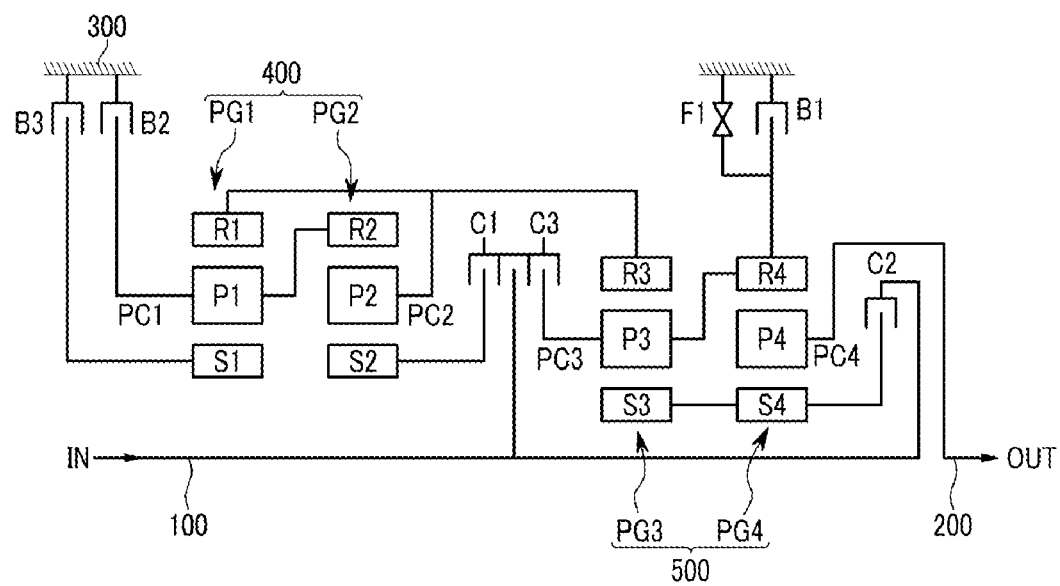
FIG. 1 is a schematic diagram of a power train of an automatic transmission according to a first exemplary embodiment of the present invention.

Exemplary embodiments of the present invention will hereinafter be described in detail with reference to the accompanying drawings.

As shown in FIG. 1 to FIG. 16, a power train of an automatic transmission according to exemplary embodiments of the present invention includes an input shaft 100, which receives torque from an engine (not shown); an output gear 200, which outputs torque from the power train; a transmission case 300; and a speed reduction unit 400, which includes a first variable input member, first and second variable stopped members, and a reduced speed output member. The speed reduction unit 400 generates first and second reduced rotational speeds that are smaller than a rotational speed of the input shaft 100 at the reduced speed output member.

Exemplary embodiments of the power train further include an output unit 500, which includes a reduced speed input member, second and third variable input members, a third variable stopped member, and a shifted speed output member. The output unit receives torque from the input shaft 100 and the speed reduction unit 400, and generates eight forward speeds and two reverse speeds at the shifted speed output member.

The first variable input member is variably connected to the input shaft 100 via a first clutch C1. The second variable input member is variably connected to the input shaft 100 via a second clutch C2. The third variable input member is variably connected to the input shaft 100 via a third clutch C3.

The third variable stopped member is variably connected to the transmission case 300 via a first brake B1 and is subjected to a stopping operation of the first brake B1. The first variable stopped member is variably connected to the transmission case 300 via a second brake B2 and is subjected to a stopping operation of the second brake B2. The second variable stopped member is variably connected to the transmission case 300 via a third brake B3 and is subjected to a stopping operation of the third brake B3.

The reduced speed output member is fixedly connected to the output unit 500. Therefore, the reduced speed output member transmits the first and second reduced rotational speeds, which are smaller than the rotational speed of the input shaft 100, to the output unit 500.

The reduced speed input member is fixedly connected to the reduced speed output member and receives the first and second reduced rotational speeds.

The shifted speed output member always acts as an output element by being fixedly connected to the output gear 200.

In addition, a one-way clutch F1 disposed between the third variable stopped member and the transmission case 300 is disposed in parallel with the first brake B1.

In addition, according to the exemplary embodiments of the present invention, the input shaft 100 and the output gear 200 are disposed on the same side, i.e. the speed reduction unit 400, the output unit 500, the clutches C1, C2, and C3, and the brakes B1, B2, and B3 are all disposed between the transmission case 300 on one side, and the input shaft 100 and the output gear 200 on the opposite side.

The first and third clutches C1 and C3 are disposed between the speed reduction unit 400 and the output unit 500, and the second clutch C2 is disposed opposite the speed reduction unit 400 with reference to the output unit 500.

The second and third brakes B2 and B3 are disposed opposite the first brake B1 with reference to the speed reduction unit 400.

As shown in FIG. 1, according to a first exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. A first pinion gear P1, being engaged with both the first ring gear R1 and the first sun gear S1, is connected to and carried by the first planet carrier PC1.

The second planetary gear set PG2 is a single pinion planetary gear set, and includes a second sun gear S2, a second planet carrier PC2, and a second ring gear R2. A second pinion gear P2, engaged with both the second ring gear R2 and the second sun gear S2, is connected to and carried by the second planet carrier PC2.

The third planetary gear set PG3 is a single pinion planetary gear set, and includes a third sun gear S3, a third planet carrier PC3, and a third ring gear R3. A third pinion gear P3, engaged with both the third ring gear R3 and the third sun gear S3, is connected to and carried by the third planet carrier PC3.

The fourth planetary gear set PG4 is a single pinion planetary gear set, and includes a fourth sun gear S4, a fourth planet carrier PC4, and a fourth ring gear R4. A fourth pinion gear P4, engaged with both the fourth ring gear R4 and the fourth sun gear S4, is connected to and carried by the fourth planet carrier PC4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the first exemplary embodiment of the present invention, the second sun gear S2 is the first variable input member, the first planet carrier PC1 is the first variable stopped member, the first sun gear S1 is the second variable stopped member, and at least one of the fixedly connected first ring gear R1 and the second planet carrier PC2 is the reduced speed output member.

The first planet carrier PC1 is fixedly connected to the second ring gear R2, and the second planet carrier PC2 is fixedly connected to the first ring gear R1.

In addition, the third ring gear R3 is the reduced speed input member, the fourth sun gear S4 is the second variable input member, the third planet carrier PC3 is the third variable input member, the fourth ring gear R4 is the third variable stopped member, and the fourth planet carrier PC4 is the shifted speed output member.

The third planet carrier PC3 is fixedly connected to the fourth ring gear R4, and the third sun gear S3 is fixedly connected to the fourth sun gear S4.

Hereinafter, operations of a power train according to the first exemplary embodiment of the present invention will be described in detail.

As shown in FIG. 17, according to the first exemplary embodiment of the present invention, the second clutch C2, the third brake B3, and the one-way clutch F1 or the first brake B1 are operated in a first forward speed D1, the second clutch C2 and the second and third brakes B2 and B3 are operated in a second forward speed D2, the first and second clutches C1 and C2 and the second brake B2 are operated in a third forward speed D3, the first and second clutches C1 and C2 and the third brake B3 are operated in a fourth forward speed D4, the first, second, and third clutches C1, C2, and C3 are operated in a fifth forward speed D5, the first and third clutches C1 and C3 and the third brake B3 are operated in a sixth forward speed D6, the first and third clutches C1 and C3 and the second brake B2 are operated in a seventh forward speed D7, and the third clutch C3 and the second and third brakes B2 and B3 are operated in an eighth forward speed D8.

In addition, the first clutch C1 and the first and second brakes B1 and B2 are operated in a first reverse speed REV. 1, and the first clutch C1 and the first and third brakes B1 and B3 are operated in a second reverse speed REV. 2.

Hereinafter, up-shifting processes of the power train of an automatic transmission according to the first exemplary embodiment of the present invention will be described in detail.

In the shifting process from the first forward speed D1 to the second forward speed D2, the first brake B1 is released and the second brake B2 is operated. In the shifting process form the second forward speed D2 to the third forward speed D3, the third brake B3 is released and the first clutch C1 is operated. In the shifting process from the third forward speed D3 to the fourth forward speed D4, the second brake B2 is released and the third brake B3 is operated. In the shifting process from the fourth forward speed D4 to the fifth forward speed D5, the third brake B3 is released and the third clutch C3 is operated. In the shifting process from the fifth forward speed D5 to the sixth forward speed D6, the second clutch C2 is released and the third brake B3 is operated. In the shifting process from the sixth forward speed D6 to the seventh forward speed D7, the third brake B3 is released and the second brake B2 is operated. In the shifting process from the seventh forward speed D7 to the eighth forward speed D8, the first clutch C1 is released and the third brake B3 is operated.

Down-shifting processes are reverse processes of the up-shifting processes.

Hereinafter, skip down-shifting processes according to the first exemplary embodiment of the present invention will be described in detail.

In the skip down-shifting process from the third forward speed D3 to the first forward speed D1, the first clutch C1 and the second brake B2 are released, and the first brake B1 and the third brake B3 are operated. In the skip down-shifting process from the fourth forward speed D4 to the second forward speed D2, the first clutch C1 is released and the second brake B2 is operated. In the skip down-shifting process from the fourth forward speed D4 to the first forward speed D1, the first clutch C1 is released and the first brake B1 is operated. In the skip down-shifting process from the fifth forward speed D5 to the third forward speed D3, the third clutch C3 is released and the second brake B2 is operated.

In the skip down-shifting process from the fifth forward speed D5 to the second forward speed D2, 5→4 shifting and 4→2 shifting may be performed in sequence or 5→3 shifting and 3→2 shifting may be performed in sequence.

In the skip down-shifting process from the sixth forward speed D6 to the fourth forward speed D4, the third clutch C3 is released and the second clutch C2 is operated.

In the skip down-shifting process from the sixth forward speed D6 to the third forward speed D3, 6→5 shifting and 5→3 shifting may be performed in sequence or 6→4 shifting and 4→3 shifting may be performed in sequence.

In the skip down-shifting process from the seventh forward speed D7 to the fifth forward speed D5, the second brake B2 is released and the second clutch C2 is operated.

In the skip down-shifting process from the seventh forward speed D7 to the fourth forward speed D4, 7→6 shifting and 6→4 shifting may be performed in sequence or 7→5 shifting and 5→4 shifting may be performed in sequence.

In the skip down-shifting process from the eighth forward speed D8 to the sixth forward speed D6, the second brake B2 is released and the first clutch C1 is operated.

In the skip down-shifting process from the eighth forward speed D8 to the fifth forward speed D5, 8→6 shifting and 6→5 shifting may be performed in sequence or 8→7 shifting and 7→5 shifting may be performed in sequence.

Skip up-shifting processes are reverse processes of the skip down-shifting processes.

Alternatively, as shown in FIG. 18, the power train of an automatic transmission according to the first embodiment of the present invention may be used for realizing seven forward speeds and two reverse speeds by removing the eighth forward speed D8.

Figure 19:
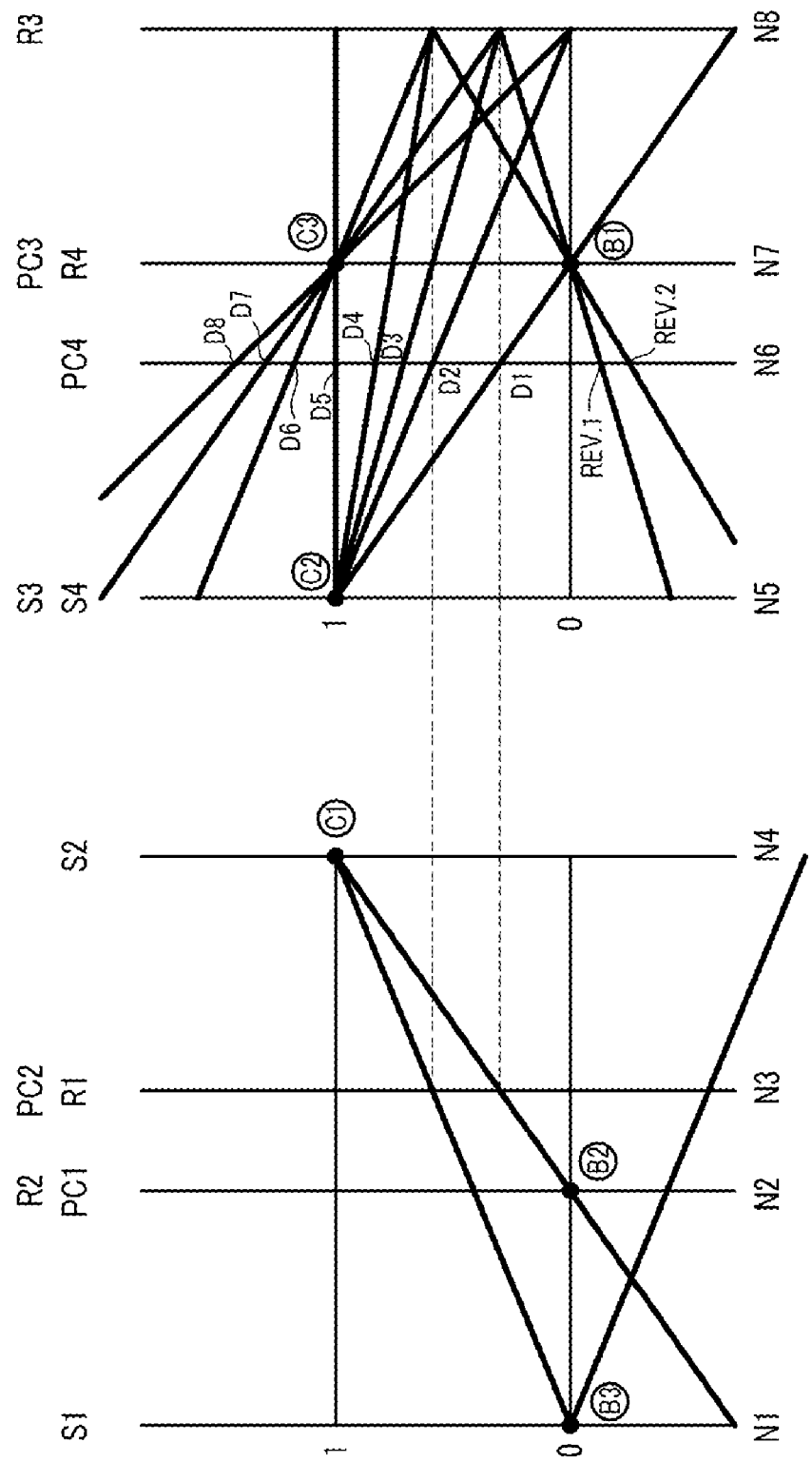
FIG. 19 is a lever diagram showing shifting processes from a first forward speed to an eighth forward speed, and from a first reverse speed to a second reverse speed in the power train of FIG. 1.

As shown in FIG. 19, the power train of an automatic transmission according to the first exemplary embodiment of the present invention includes four single pinion planetary gear sets. In addition, the first ring gear R1 is fixedly connected to the second planet carrier PC2, and the second ring gear R2 is fixedly connected to the first planet carrier PC1. The third sun gear S3 is fixedly connected to the fourth sun gear S4, and the third planet carrier PC3 is fixedly connected to the fourth ring gear R4. Therefore, operational members of the exemplary power train of an automatic transmission according to the first embodiment of the present invention are represented as eight nodes in the lever diagram.

Accordingly, the first sun gear S1 is set to a first node N1, the second ring gear R2 and the first planet carrier PC1 are set to a second node N2, the second planet carrier PC2 and the first ring gear R1 are set to a third node N3, the second sun gear S2 is set to a fourth node N4, the third sun gear S3 and the fourth sun gear S4 are set to a fifth node N5, the fourth planet carrier PC4 is set to a sixth node N6, the third planet carrier PC3 and the fourth ring gear R4 are set to a seventh node N7, and the third ring gear R3 is set to an eighth node N8.

As described above, the second sun gear S2 is variably connected to the input shaft 100 via the first clutch C1. Therefore, rotational speed of the engine is delivered to the fourth node N4 through the input shaft 100 according to an operation of the first clutch C1.

The first planet carrier PC1 and the first sun gear S1 are variably connected to the transmission case 300 via the second and third brakes B2 and B3, respectively. Therefore, the second node N2 and the first node N1 may be stopped by operations of the second and third brakes B2 and B3, respectively.

Thus, the rotational speed of the engine variably input through the fourth node N4 is changed to the first and second reduced rotational speeds at the third node N3 of the first ring gear R1 and the second planet carrier PC2 by an operation of the speed reduction unit 400.

In addition, the third ring gear R3 is fixedly connected to at least one of the fixedly connected first ring gear R1 and the second planet carrier PC2. Therefore, the eighth node N8 of the third ring gear R3 rotates with the same rotational speed of the third node N3.

In addition, the fourth sun gear S4 and the third planet carrier PC3 are variably connected to the input shaft 100 via the second and third clutches C2 and C3. Therefore, the rotational speed of the engine input through the input shaft 100 is delivered to the fifth and seventh nodes N5 and N7 by operations of the second and third clutches C2 and C3, respectively.

In addition, the fourth ring gear R4 is variably connected to the transmission case 300 via the first brake B1. Therefore, the seventh node N7 may be stopped by an operation of the first brake B1.

In addition, the fourth planet carrier PC4 is fixedly connected to the output gear 200. Therefore, the sixth node N6 outputs each shift speed that is generated by operations of the speed reduction unit 400 and the output unit 500 to the output gear 200.

Hereinafter, formation of each speed by the power train of an automatic transmission according to the first exemplary embodiment of the present invention will be described in detail, with reference to FIG. 19.

In the first forward speed D1, the seventh node N7 is stationary since the first brake B1 is operated, and the fifth node N5 rotates with the same rotational speed of the input shaft 100 since the second clutch C2 is operated. Therefore, the first forward speed D1 is achieved at the sixth node N6 that is the shifted speed output member.

In the second forward speed D2, the first and second nodes N1 and N2 are stationary since the second and third brakes B2 and B3 are operated. Therefore, the third node N3 is stationary, and the eighth node N8 fixedly connected thereto is also stationary. In addition, the fifth node N5 rotates with the same rotational speed of the input shaft 100 since the second clutch C2 is operated. Therefore, the second forward speed D2 is achieved at the sixth node N6 that is the shifted speed output member.

In the third forward speed D3, the second node N2 is stationary since the second brake B2 is operated, and the fourth node N4 rotates with the same rotational speed of the input shaft 100 since the first clutch C1 is operated. Therefore, the third node N3 rotates with the first reduced rotational speed, and the eighth node N8 fixedly connected thereto also rotates with the first reduced rotational speed. In addition, the fifth node N5 rotates with the same rotational speed of the input shaft 100 since the second clutch C2 is operated. Therefore, the third forward speed D3 is achieved at the sixth node N6 that is the shifted speed output member.

In the fourth forward speed D4, the first node N1 is stationary since the third brake B3 is operated, and the fourth node N4 rotates with the same rotational speed of the input shaft 100 since the first clutch C1 is operated. Therefore, the third node N3 rotates with the second reduced rotational speed, and the eighth node N8 fixedly connected thereto also rotates with the second reduced rotational speed. In addition, the fifth node N5 rotates with the same rotational speed of the input shaft 100 since the second clutch C2 is operated. Therefore, the fourth forward speed D4 is achieved at the sixth node N6 that is the shifted speed output member.

In the fifth forward speed D5, the fourth, fifth, and seventh nodes N4, N5, and N7 rotate with the same rotational speed of the input shaft 100 since the first, second, and third clutches C1, C2, and C3 are operated. Therefore, the fifth forward speed D5 is achieved at the sixth node N6 that is the shifted speed output member.

In the sixth forward speed D6, the first node N1 is stationary since the third brake B3 is operated, and the fourth node N4 rotates with the same rotational speed of the input shaft 100 since the first clutch C1 is operated. Therefore, the third node N3 rotates with the second reduced rotational speed, and the eighth node N8 fixedly connected thereto also rotates with the second reduced rotational speed. In addition, the seventh node N7 rotates with the same rotational speed of the input shaft 100 since the third clutch C3 is operated. Therefore, the sixth forward speed D6 is achieved at the sixth node N6 that is the shifted speed output member.

In the seventh forward speed D7, the second node N2 is stationary since the second brake B2 is operated, and the fourth node N4 rotates with the same rotational speed of the input shaft 100 since the first clutch C1 is operated. Therefore, the third node N3 rotates with the first reduced rotational speed, and the eighth node N8 fixedly connected thereto also rotates with the first reduced rotational speed. In addition, the seventh node N7 rotates with the same rotational speed of the input shaft 100 since the third clutch C3 is operated. Therefore, the seventh forward speed D7 is achieved at the sixth node N6 that is the shifted speed output member.

In the eighth forward speed D8, the first and second nodes N1 and N2 are stationary since the second and third brakes B2 and B3 are operated. Therefore, the third node N3 is stationary, and the eighth node N8 fixedly connected thereto is also stationary. In addition, the seventh node N7 rotates with the same rotational speed of the input shaft 100 since the third clutch C3 is operated. Therefore, the eighth forward speed D8 is achieved at the sixth node N6 that is the shifted speed output member.

In the first reverse speed REV. 1, the second node N2 is stationary since the second brake B2 is operated, and the fourth node N4 rotates with the same rotational speed of the input shaft 100 since the first clutch C1 is operated. Therefore, the third node N3 rotates with the first reduced rotational speed, and the eighth node N8 fixedly connected thereto also rotates with the first reduced rotational speed. In addition, the seventh node N7 is stationary since the first brake B1 is operated. Therefore, the first reverse speed REV. 1 is achieved at the sixth node N6 that is the shifted speed output member.

In the second reverse speed REV. 2, the first node N1 is stationary since the third brake B3, and the fourth node N4 rotates with the same rotational speed of the input shaft 100 since the first clutch C1 is operated. Therefore, the third node N3 rotates with the second reduced rotational speed, and the eighth node N8 fixedly connected thereto also rotates with the second reduced rotational speed. In addition, the seventh node N7 is stationary since the first brake B1 is operated. Therefore, the second reverse speed REV. 2 is achieved at the sixth node N6 that is the shifted speed output member.

The speed line for each planetary gear set will be understood by a person of an ordinary skill in the art based on the teachings herein.

Figure 2:
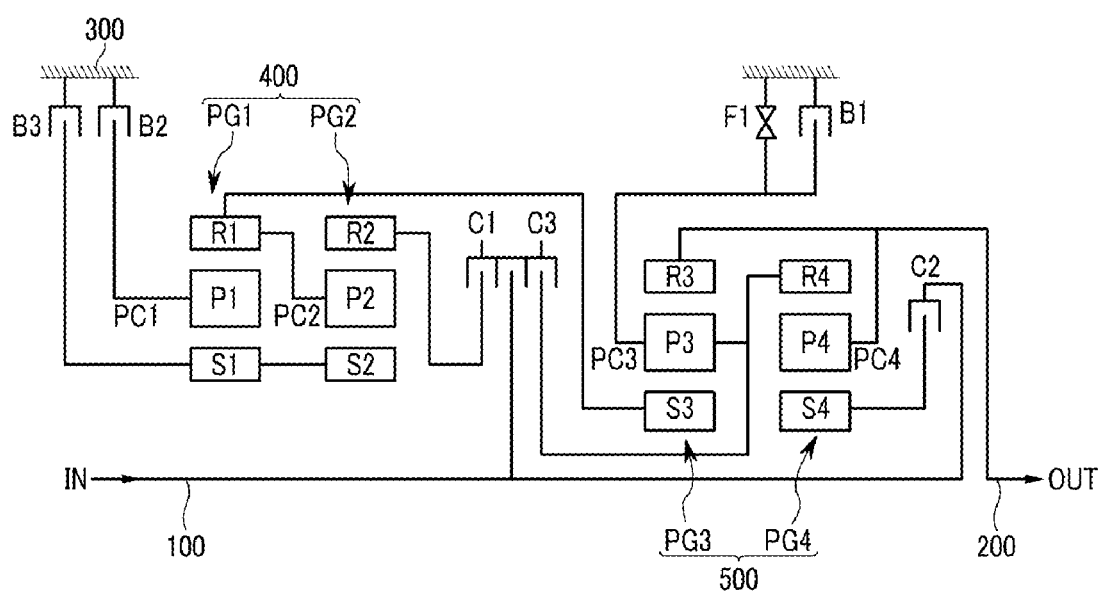
FIG. 2 is a schematic diagram of a power train of an automatic transmission according to a second exemplary embodiment of the present invention.

As shown in FIG. 2, according to a second exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The third planetary gear set PG3 is a single pinion planetary gear set, and includes a third sun gear S3, a third planet carrier PC3, and a third ring gear R3. The fourth planetary gear set PG4 is a single pinion planetary gear set, and includes a fourth sun gear S4, a fourth planet carrier PC4, and a fourth ring gear R4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the second exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first sun gear S1 is fixedly connected to the second sun gear S2.

In addition, the third sun gear S3 is the reduced speed input member, the fourth sun gear S4 is the second variable input member, at least one of the fixedly connected third planet carrier PC3 and the fourth ring gear R4 is the third variable input member, the third planet carrier PC3 is the third variable stopped member, and at least one of the fixedly connected third ring gear R3 and the fourth planet carrier PC4 is the shifted speed output member.

The third planet carrier PC3 is fixedly connected to the fourth ring gear R4, and the fourth planet carrier PC4 is fixedly connected to the third ring gear R3.

Figure 3:
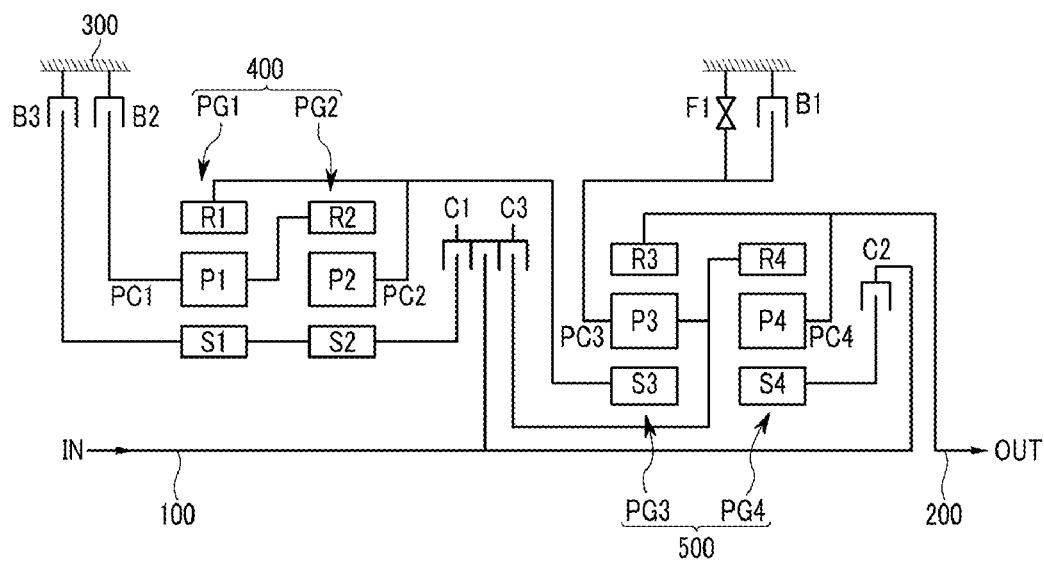
FIG. 3 is a schematic diagram of a power train of an automatic transmission according to a third exemplary embodiment of the present invention.

As shown in FIG. 3, according to a third exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The third planetary gear set PG3 is a single pinion planetary gear set, and includes a third sun gear S3, a third planet carrier PC3, and a third ring gear R3. The fourth planetary gear set PG4 is a single pinion planetary gear set, and includes a fourth sun gear S4, a fourth planet carrier PC4, and a fourth ring gear R4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the third exemplary embodiment of the present invention, the second sun gear S2 is the first variable input member, the first planet carrier PC1 is the first variable stopped member, the first sun gear S1 is the second variable stopped member, and at least one of the fixedly connected first ring gear R1 and the second planet carrier PC2 is the reduced speed output member.

The first planet carrier PC1 is fixedly connected to the second ring gear R2, the second planet carrier PC2 is fixedly connected to the first ring gear R1.

In addition, the third sun gear S3 is the reduced speed input member, the fourth sun gear S4 is the second variable input member, at least one of the fixedly connected third planet carrier PC3 and the fourth ring gear R4 is the third variable input member, the third planet carrier PC3 is the third variable stopped member, and at least one of the fixedly connected third ring gear R3 and the fourth planet carrier PC4 is the shifted speed output member.

The third planet carrier PC3 is fixedly connected to the fourth ring gear R4, and the third ring gear R3 is fixedly connected to the fourth planet carrier PC4.

Figure 4:
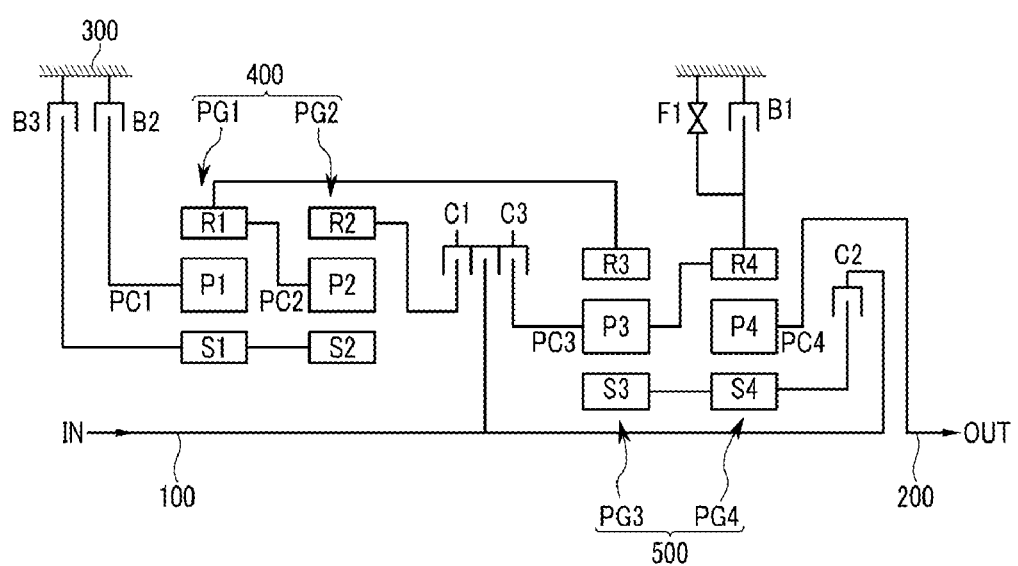
FIG. 4 is a schematic diagram of a power train of an automatic transmission according to a fourth exemplary embodiment of the present invention.

As shown in FIG. 4, according to a fourth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The third planetary gear set PG3 is a single pinion planetary gear set, and includes a third sun gear S3, a third planet carrier PC3, and a third ring gear R3. The fourth planetary gear set PG4 is a single pinion planetary gear set, and includes a fourth sun gear S4, a fourth planet carrier PC4, and a fourth ring gear R4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the fourth exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first sun gear S1 is fixedly connected to the second sun gear S2.

In addition, the third ring gear R3 is the reduced speed input member, the fourth sun gear S4 is the second variable input member, the third planet carrier PC3 is the third variable input member, the fourth ring gear R4 is the third variable stopped member, and the fourth planet carrier PC4 is the shifted speed output member.

The third planet carrier PC3 is fixedly connected to the fourth ring gear R4, and the third sun gear S3 is fixedly connected to the fourth sun gear S4.

Figure 5:
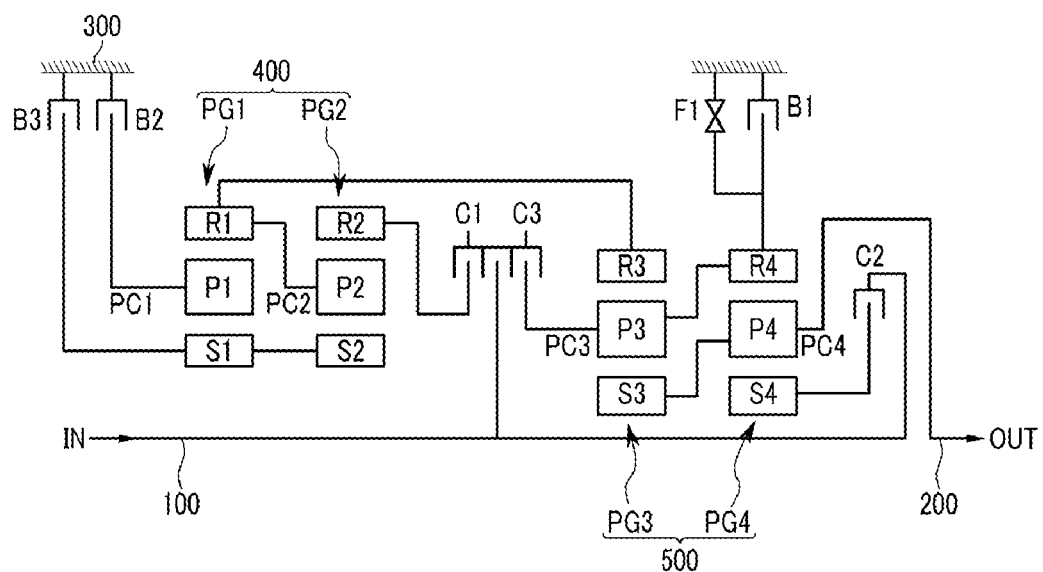
FIG. 5 is a schematic diagram of a power train of an automatic transmission according to a fifth exemplary embodiment of the present invention.

As shown in FIG. 5, according to a fifth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The third planetary gear set PG3 is a single pinion planetary gear set, and includes a third sun gear S3, a third planet carrier PC3, and a third ring gear R3. The fourth planetary gear set PG4 is a single pinion planetary gear set, and includes a fourth sun gear S4, a fourth planet carrier PC4, and a fourth ring gear R4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the fifth exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first sun gear S1 is fixedly connected to the second sun gear S2.

In addition, the third ring gear R3 is the reduced speed input member, the fourth sun gear S4 is the second variable input member, the third planet carrier PC3 is the third variable input member, the fourth ring gear R4 is the third variable stopped member, and the fourth planet carrier PC4 is the shifted speed output member.

The third planet carrier PC3 is fixedly connected to the fourth ring gear R4, and the third sun gear S3 is fixedly connected to the fourth planet carrier PC4.

Figure 6:
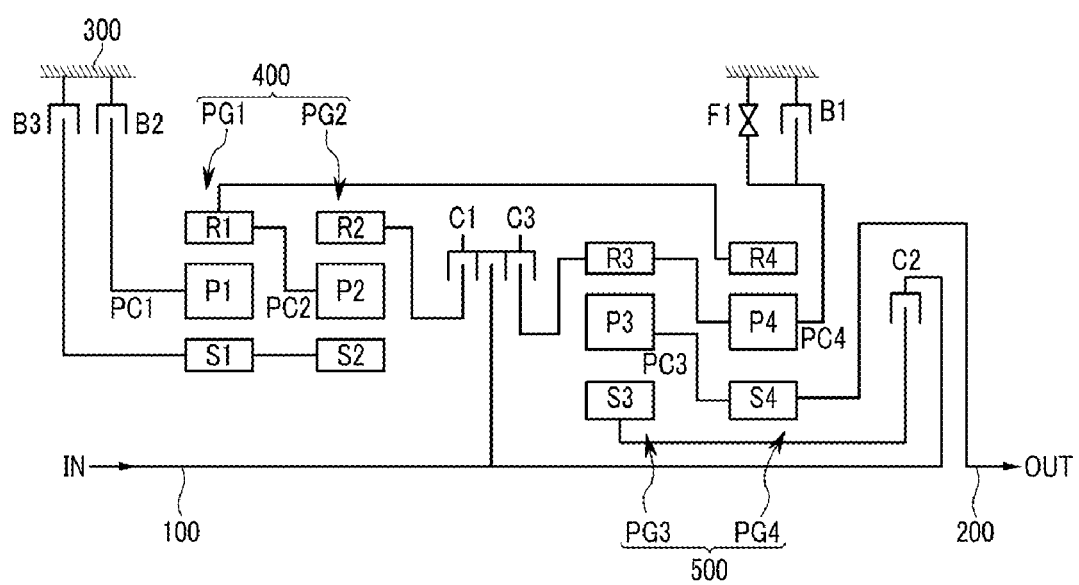
FIG. 6 is a schematic diagram of a power train of an automatic transmission according to a sixth exemplary embodiment of the present invention.

As shown in FIG. 6, according to a sixth exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The third planetary gear set PG3 is a single pinion planetary gear set, and includes a third sun gear S3, a third planet carrier PC3, and a third ring gear R3. The fourth planetary gear set PG4 is a single pinion planetary gear set, and includes a fourth sun gear S4, a fourth planet carrier PC4, and a fourth ring gear R4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the sixth exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first sun gear S1 is fixedly connected to the second sun gear S2.

In addition, the fourth ring gear R4 is the reduced speed input member, the third sun gear S3 is the second variable input member, the third ring gear R3 is the third variable input member, the fourth planet carrier PC4 is the third variable stopped member, and the fourth sun gear S4 is the shifted speed output member.

The third ring gear R3 is fixedly connected to the fourth planet carrier PC4, and the third planet carrier PC3 is fixedly connected to the fourth sun gear S4.

Figure 7:
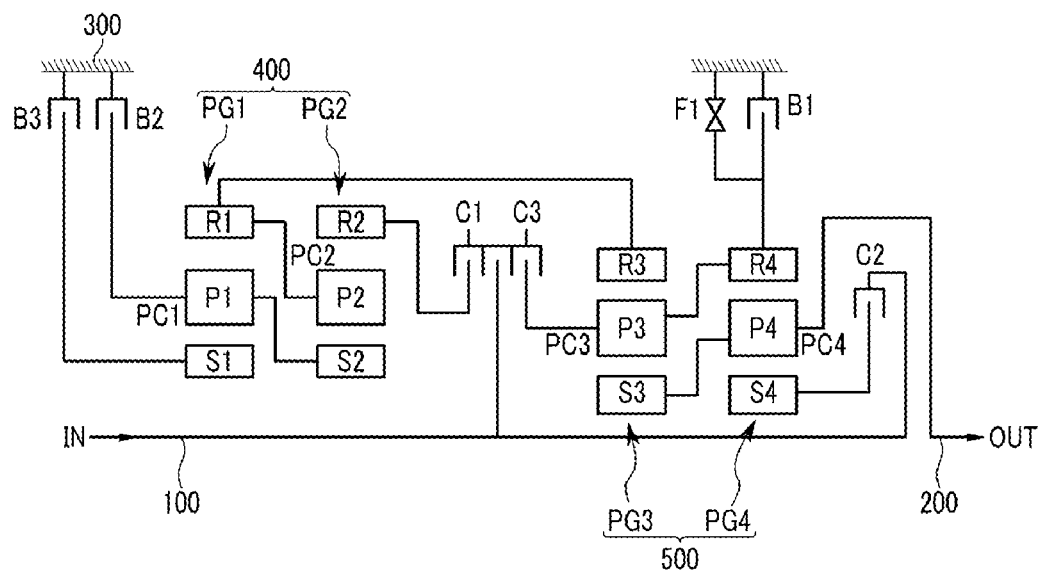
FIG. 7 is a schematic diagram of a power train of an automatic transmission according to a seventh exemplary embodiment of the present invention.

As shown in FIG. 7, according to a seventh exemplary embodiment of the present invention, the speed reduction unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The third planetary gear set PG3 is a single pinion planetary gear set, and includes a third sun gear S3, a third planet carrier PC3, and a third ring gear R3. The fourth planetary gear set PG4 is a single pinion planetary gear set, and includes a fourth sun gear S4, a fourth planet carrier PC4, and a fourth ring gear R4.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

According to the seventh exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first planet carrier PC1 is fixedly connected to the second sun gear S2.

In addition, the third ring gear R3 is the reduced speed input member, the fourth sun gear S4 is the second variable input member, the third planet carrier PC3 is the third variable input member, the fourth ring gear R4 is the third variable stopped member, and the fourth planet carrier PC4 is the shifted speed output member.

The third planet carrier PC3 is fixedly connected to the fourth ring gear R4, and the third sun gear S3 is fixedly connected to the fourth planet carrier PC4.

Figure 8:
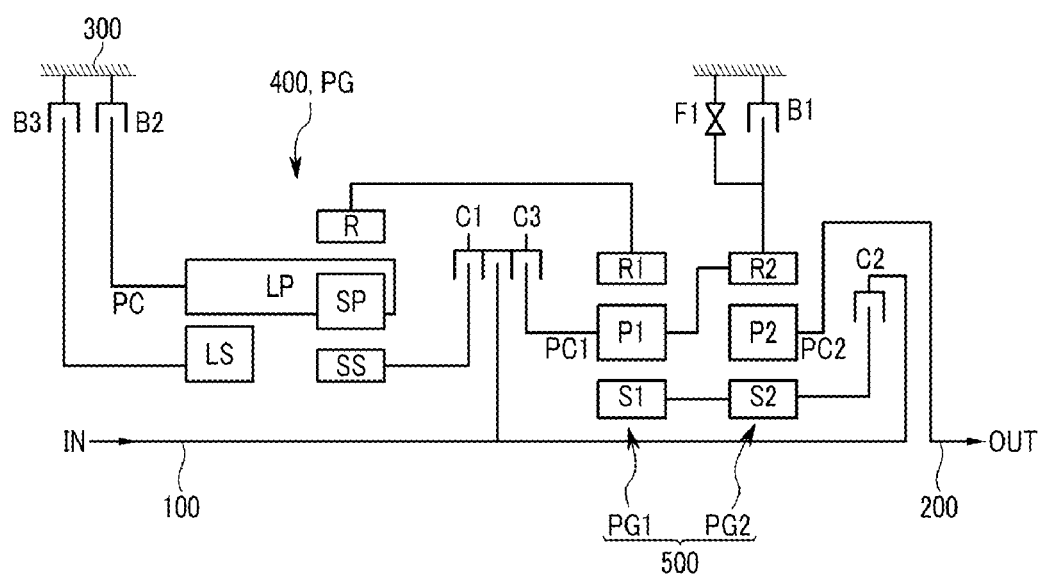
FIG. 8 is a schematic diagram of a power train of an automatic transmission according to an eighth exemplary embodiment of the present invention.

As shown in FIG. 8, according to an eighth exemplary embodiment of the present invention, the speed reduction unit 400 includes a ravingneaux planetary gear set PG, and the output unit 500 includes first and second planetary gear sets PG1 and PG2.

The ravingneaux planetary gear set PG includes a ravingneaux ring gear R, a ravingneaux planet carrier PC, a long-pinion-side sun gear LS, and a short-pinion-side sun gear SS. A long pinion gear LP, engaged with both the long-pinion-side sun gear LS and the ravingneaux ring gear R, and a short pinion gear SP, engaged with both the short-pinion-side sun gear SS and the ravingneaux ring gear R, are connected to and carried by the ravingneaux planet carrier PC.

The first planetary gear set PG1 is a single pinion planetary gear set, and includes a first sun gear S1, a first planet carrier PC1, and a first ring gear R1.

The second planetary gear set PG2 is a single pinion planetary gear set, and includes a second sun gear S2, a second planet carrier PC2, and a second ring gear R2.

In addition, the ravingneaux planetary gear set PG and the first and second planetary gear sets PG1 and PG2 are disposed in a sequence of the ravingneaux planetary gear set PG, the first planetary gear set PG1, and the second planetary gear set PG2.

According to the eighth exemplary embodiment of the present, the short-pinion-side sun gear SS is the first variable input member, the ravingneaux planet carrier PC is the first variable stopped member, the long-pinion-side sun gear LS is the second variable stopped member, and the ravingneaux ring gear R is the reduced speed output member.

In addition, the first ring gear R1 is the reduced speed input member, the second sun gear S2 is the second variable input member, the first planet carrier PC1 is the third variable input member, the second ring gear R2 is the third variable stopped member, and the second planet carrier PC2 is the shifted speed output member.

The first sun gear S1 is fixedly connected to the second sun gear S2, and the first planet carrier PC1 is fixedly connected to the second ring gear R2.

Figure 9:
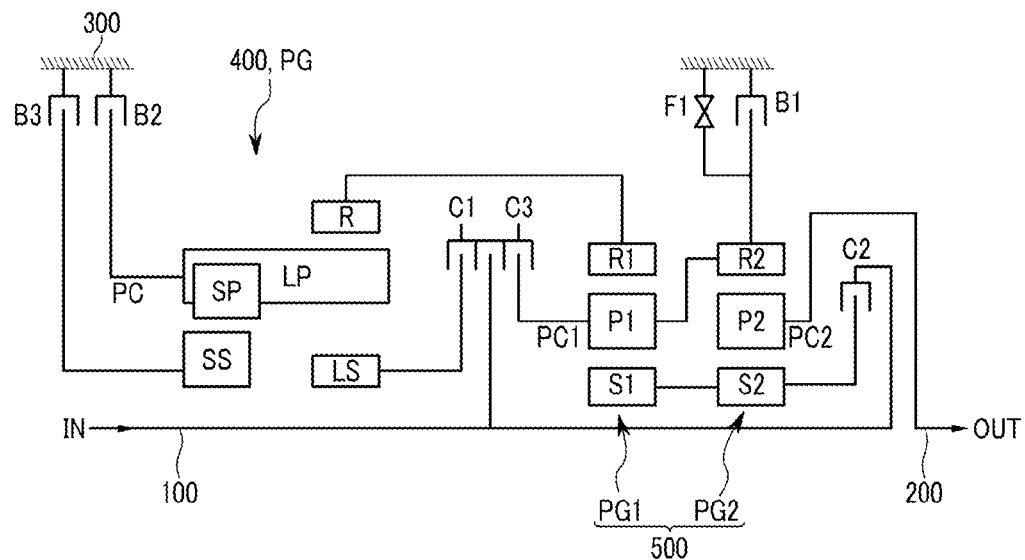
FIG. 9 is a schematic diagram of a power train of an automatic transmission according to a ninth exemplary embodiment of the present invention.

As shown in FIG. 9, according to a ninth exemplary embodiment of the present invention, the speed reduction unit 400 includes a ravingneaux planetary gear set PG, and the output unit 500 includes first and second planetary gear sets PG1 and PG2.

The ravingneaux planetary gear set PG includes a ravingneaux ring gear R, a ravingneaux planet carrier PC, a long-pinion-side sun gear LS, and a short-pinion-side sun gear SS. The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2.

In addition, the ravingneaux planetary gear set PG and the first and second planetary gear sets PG1 and PG2 are disposed in a sequence of the ravingneaux planetary gear set PG, the first planetary gear set PG1, and the second planetary gear set PG2.

According to the ninth exemplary embodiment of the present invention, the long-pinion-side sun gear LS is the first variable input member, the ravingneaux planet carrier PC is the first variable stopped member, the short-pinion-side sun gear SS is the second variable stopped member, and the ravingneaux ring gear R is the reduced speed output member.

In addition, the first ring gear R1 is the reduced speed input member, the second sun gear S2 is the second variable input member, the first planet carrier PC3 is the third variable input member, the second ring gear R2 is the third variable stopped member, and the second planet carrier PC2 is the shifted speed output member.

The first planet carrier PC1 is fixedly connected to the second ring gear R2, and the first sun gear S1 is fixedly connected to the second sun gear S2.

Figure 10:
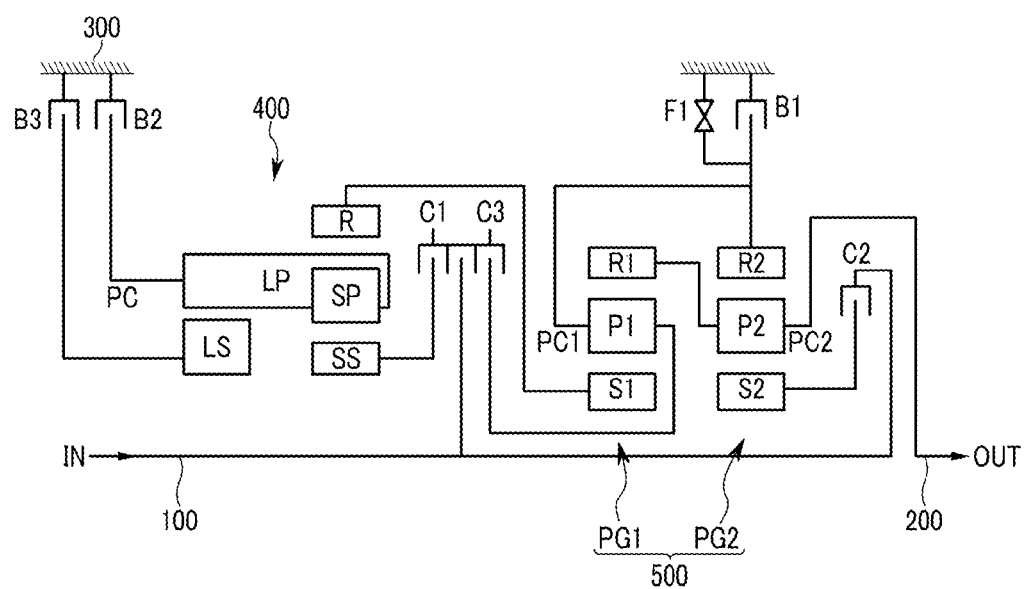
FIG. 10 is a schematic diagram of a power train of an automatic transmission according to a tenth exemplary embodiment of the present invention.

As shown in FIG. 10, according to a tenth exemplary embodiment of the present invention, the speed reduction unit 400 includes a ravingneaux planetary gear set PG, and the output unit 500 includes first and second planetary gear sets PG1 and PG2.

The ravingneaux planetary gear set PG includes a ravingneaux ring gear R, a ravingneaux planet carrier PC, a long-pinion-side sun gear LS, and a short-pinion-side sun gear SS.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2.

In addition, the ravingneaux planetary gear set PG and the first and second planetary gear sets PG1 and PG2 are disposed in a sequence of the ravingneaux planetary gear set PG, the first planetary gear set PG1, and the second planetary gear set PG2.

According to the tenth exemplary embodiment of the present invention, the short-pinion-side sun gear SS is the first variable input member, the ravingneaux planet carrier PC is the first variable stopped member, the long-pinion-side sun gear LS is the second variable stopped member, and the ravingneaux ring gear R is the reduced speed output member.

In addition, the first sun gear S1 is the reduced speed input member, the second sun gear S2 is the second variable input member, the first planet carrier PC1 is the third variable input member, at least one of the fixedly connected first planet carrier PC1 and the second ring gear R2 is the third variable stopped member, and the second planet carrier PC2 is the shifted speed output member.

The first ring gear R1 is fixedly connected to the second planet carrier PC2, and the first planet carrier PC1 is fixedly connected to the second ring gear R2.

Figure 11:
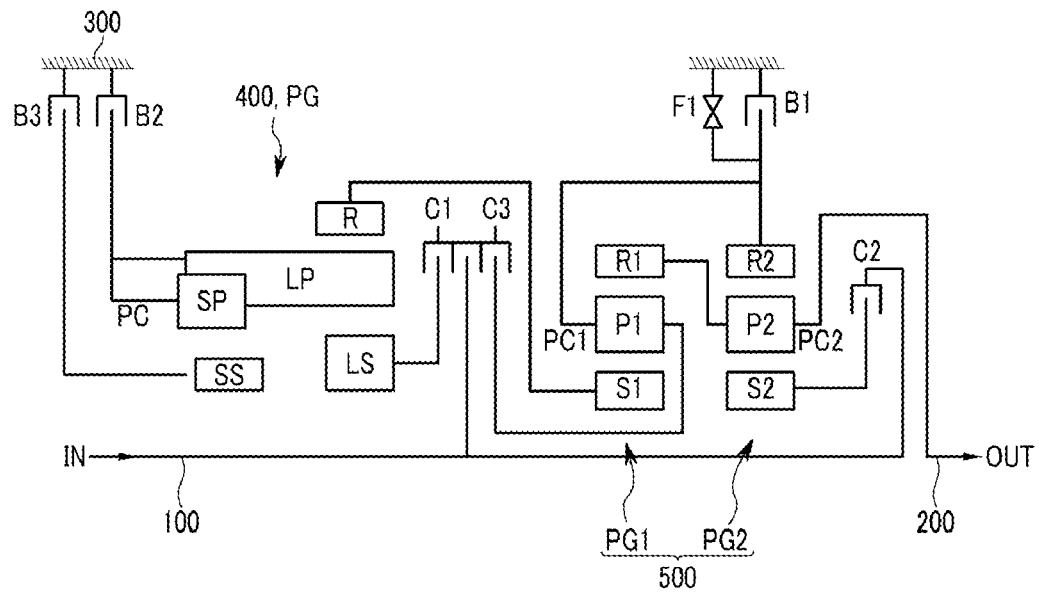
FIG. 11 is a schematic diagram of a power train of an automatic transmission according to an eleventh exemplary embodiment of the present invention.

As shown in FIG. 11, according to an eleventh exemplary embodiment of the present invention, the speed reduction unit 400 includes a ravingneaux planetary gear set PG, and the output unit 500 includes first and second planetary gear sets PG1 and PG2.

The ravingneaux planetary gear set PG includes a ravingneaux ring gear R, a ravingneaux planet carrier PC, a long-pinion-side sun gear LS, and a short-pinion-side sun gear SS. The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2.

In addition, the ravingneaux planetary gear set PG and the first and second planetary gear sets PG1 and PG2 are disposed in a sequence of the ravingneaux planetary gear set PG, the first planetary gear set PG1, and the second planetary gear set PG2.

According to the eleventh exemplary embodiment of the present invention, the long-pinion-side sun gear LS is the first variable input member, the ravingneaux planet carrier PC is the first variable stopped member, the short-pinion-side sun gear SS is the second variable stopped member, and the ravingneaux ring gear R is the reduced speed output member.

In addition, the first sun gear S1 is the reduced speed input member, the second sun gear S2 is the second variable input member, the first planet carrier PCI is the third variable input member, at least one of the fixedly connected first planet carrier PC1 and the second ring gear R2 is the third variable stopped member, and the second planet carrier PC2 is the shifted speed output member.

The first ring gear R1 is fixedly connected to the second planet carrier PC2, and the first planet carrier PC1 is fixedly connected to the second ring gear R2.

Figure 12:
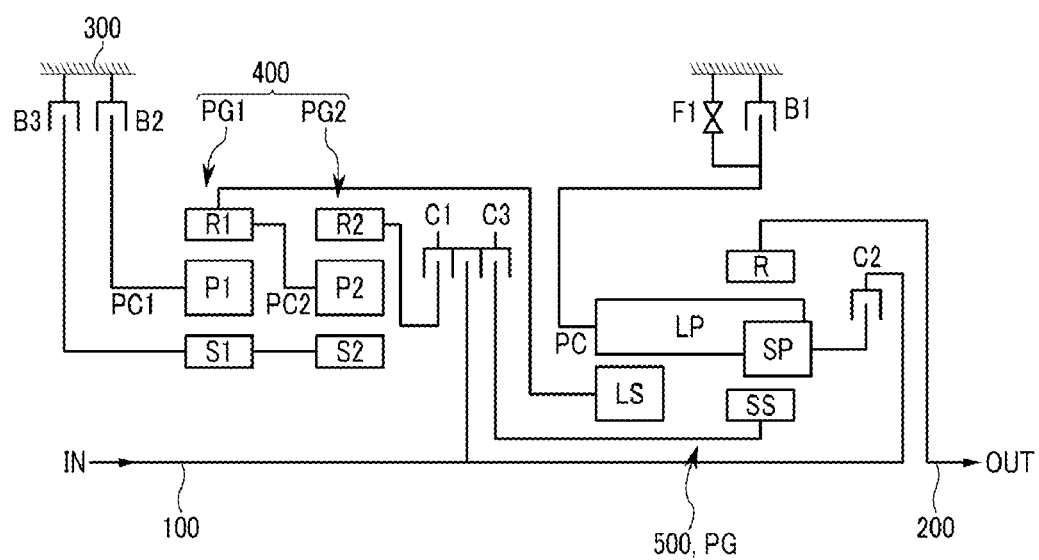
FIG. 12 is a schematic diagram of a power train of an automatic transmission according to a twelfth exemplary embodiment of the present invention.

As shown in FIG. 12, according to a twelfth exemplary embodiment of the present invention, the speed reduction unit 400 includes first and second planetary gear sets PG1 and PG2, and the output unit 500 includes a ravingneaux planetary gear set PG.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The ravingneaux planetary gear set PG includes a ravingneaux ring gear R, a ravingneaux planet carrier PC, a long-pinion-side sun gear LS, and a short-pinion-side sun gear SS.

In addition, the first and second planetary gear sets PG1 and PG2 and the ravingneaux planetary gear set PG are disposed in a sequence of the first planetary gear set PG1, the second planetary gear set PG2, and the ravingneaux planetary gear set PG.

According to the twelfth exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first sun gear S1 is fixedly connected to the second sun gear S2.

In addition, the long-pinion-side sun gear LS is the reduced speed input member, the ravingneaux planet carrier PC is the second variable input member, the short-pinion-side sun gear SS is the third variable input member, the ravingneaux planet carrier PC is the third variable stopped member, and the ravingneaux ring gear R is the shifted speed output member.

Figure 13:
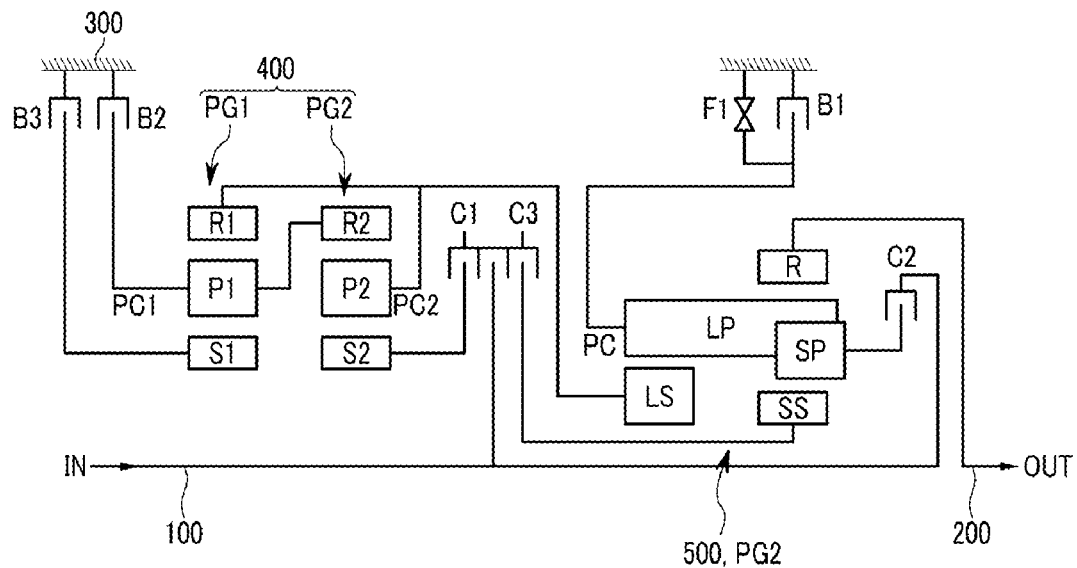
FIG. 13 is a schematic diagram of a power train of an automatic transmission according to a thirteenth exemplary embodiment of the present invention.

As shown in FIG. 13, according to a thirteenth exemplary embodiment of the present invention, the speed reduction unit 400 includes first and second planetary gear sets PG1 and PG2, and the output unit 500 includes a ravingneaux planetary gear set PG.

The first planetary gear set PG1 is a single pinion planetary gear set, and includes a first sun gear S1, a first planet carrier PC1, and a first ring gear R1 f. The second planetary gear set PG2 is a single pinion planetary gear set, and includes a second sun gear S2, a second planet carrier PC2, and a second ring gear R2. The ravingneaux planetary gear set PG includes a ravingneaux ring gear R, a ravingneaux planet carrier PC, a long-pinion-side sun gear LS, and a short-pinion-side sun gear SS.

In addition, the first and second planetary gear sets PG1 and PG2 and the ravingneaux planetary gear set PG are disposed in a sequence of the first planetary gear set PG1, the second planetary gear set PG2, and the ravingneaux planetary gear set PG.

According to the thirteenth exemplary embodiment of the present invention, the second sun gear S2 is the first variable input member, the first planet carrier PC1 is the first variable stopped member, the first sun gear S1 is the second variable stopped member, and at least one of the fixedly connected first ring gear R1 and the second planet carrier PC2 is the reduced speed output member.

The first planet carrier PC1 is fixedly connected to the second ring gear R2, and the second planet carrier PC2 is fixedly connected to the first ring gear R1.

In addition, the long-pinion-side sun gear LS is the reduced speed input member, the ravingneaux planet carrier PC is the second variable input member, the short-pinion-side sun gear SS is the third variable input member, the ravingneaux planet carrier PC is the third variable stopped member, and the ravingneaux ring gear R is the shifted speed output member.

Figure 14:
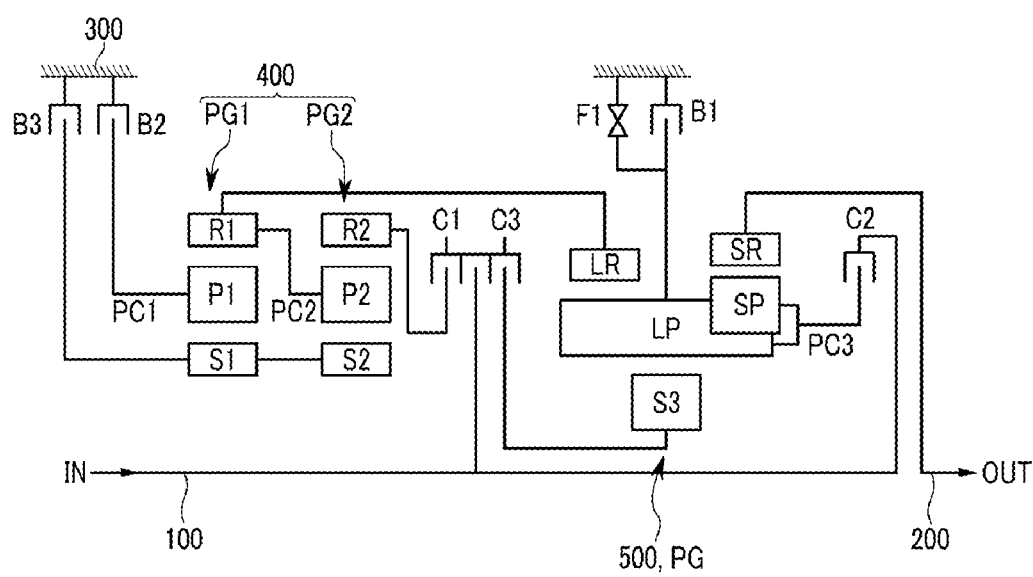
FIG. 14 is a schematic diagram of a power train of an automatic transmission according to a fourteenth exemplary embodiment of the present invention.

As shown in FIG. 14, according to a fourteenth exemplary embodiment of the present invention, the speed reduction unit 400 includes first and second planetary gear sets PG1 and PG2, and the output unit 500 includes a compound planetary gear set PG.

The first planetary gear set PG1 is a single pinion planetary gear set, and includes a first sun gear S1, a first planet carrier PC1, and a first ring gear R1. The second planetary gear set PG2 is a single pinion planetary gear set, and includes a second sun gear S2, a second planet carrier PC2, and a second ring gear R2. The compound planetary gear set PG includes a long-pinion-side ring gear LR, a short-pinion-side ring gear SR, a third planet carrier PC3, and a third sun gear S3. A long pinion gear LP, engaged with both the long-pinion-side ring gear LR and the third sun gear S3, and a short pinion gear SP, engaged with both the short-pinion-side ring gear SR and the third sun gear S3, are connected to and carried by the third planet carrier PC3.

The first and second planetary gear sets PG1 and PG2 and the compound planetary gear set PG are disposed in a sequence of the first planetary gear set PG1, the second planetary gear set PG2, and the compound planetary gear set PG.

According to the fourteenth exemplary embodiment of the present invention, the second ring gear R2 is the first variable input member, the first planet carrier PC1 is the first variable stopped member, the first sun gear S1 is the second variable stopped member, and the first ring gear R1 is the reduced speed output member.

The first ring gear R1 is fixedly connected to the second planet carrier PC2, and the first sun gear S1 is fixedly connected to the second sun gear S2.

In addition, the long-pinion-side ring gear LR is the reduced speed input member, the third planet carrier PC3 is the second variable input member, the third sun gear S3 is the third variable input member, the third planet carrier PC3 is the third variable stopped member, and the short-pinion-side ring gear SR is the shifted speed output member.

Figure 15:
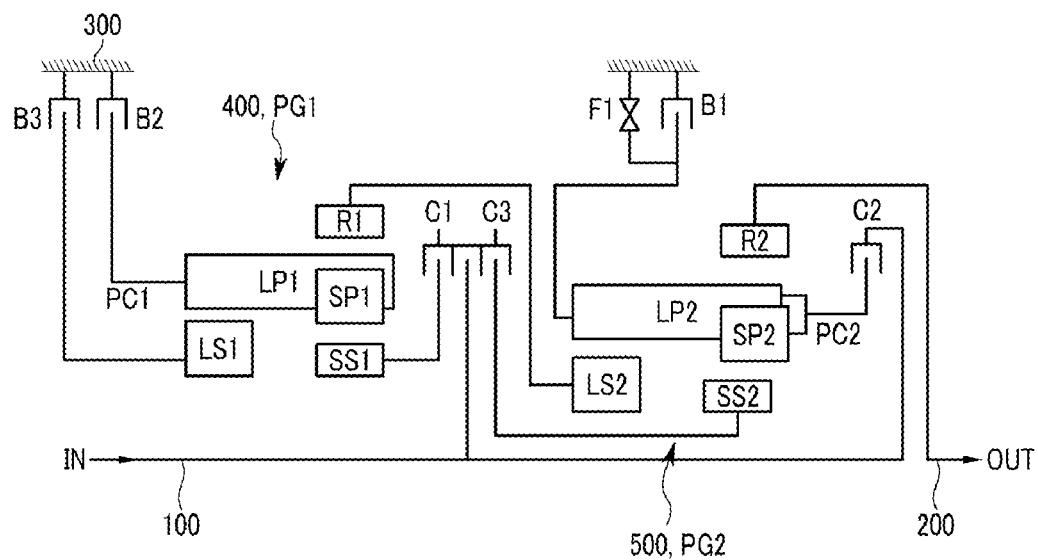
FIG. 15 is a schematic diagram of a power train of an automatic transmission according to a fifteenth exemplary embodiment of the present invention.

As shown in FIG. 15, according a fifteenth exemplary embodiment of the present invention, the speed reduction unit 400 includes a first ravingneaux planetary gear set PG1, and the output unit includes a second ravingneaux planetary gear set PG2. The first ravingneaux planetary gear set PG1 includes a first ring gear R1, a first planet carrier PC1, a first long-pinion-side sun gear LS1, and a first short-pinion-side sun gear SS1. The second ravingneaux planetary gear set PG2 includes a second ring gear R2, a second planet carrier PC2, a second long-pinion-side sun gear LS2, and a second short-pinion-side sun gear SS2.

In addition, the first and second ravingneaux planetary gear sets PG1 and PG2 are disposed in a sequence of the first ravingneaux planetary gear set PG1, and the second ravingneaux planetary gear set PG2.

According to the fifteenth exemplary embodiment of the present invention, the first short-pinion-side sun gear SS1 is the first variable input member, the first planet carrier PC1 is the first variable stopped member, the first long-pinion-side sun gear LS1 is the second variable stopped member, and the first ring gear R1 is the reduced speed output member.

In addition, the second long-pinion-side sun gear LS2 is the reduced speed input member, the second planet carrier PC2 is the second variable input member, the second short-pinion-side sun gear SS2 is the third variable input member, the second planet carrier PC2 is the third variable stopped member, and the second ring gear R2 is the shifted speed output member.

Figure 16:
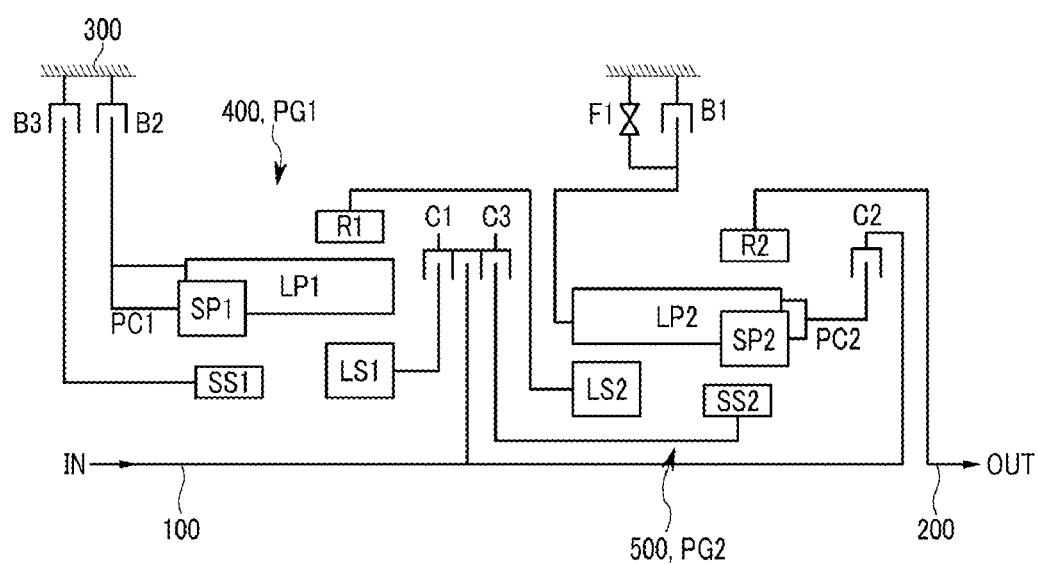
FIG. 16 is a schematic diagram of a power train of an automatic transmission according to a sixteenth exemplary embodiment of the present invention.

As shown in FIG. 16, according to a sixteenth exemplary embodiment of the present invention, the speed reduction unit 400 includes a first ravingneaux planetary gear set PG1, and the output unit includes a second ravingneaux planetary gear set PG2.

The first ravingneaux planetary gear set PG1 includes a first ring gear R1, a first planet carrier PC1, a first long-pinion-side sun gear LS1, and a first short-pinion-side sun gear SS1. The second ravingneaux planetary gear set PG2 includes a second ring gear R2, a second planet carrier PC2, a second long-pinion-side sun gear LS2, and a second short-pinion-side sun gear SS2.

In addition, the first and second ravingneaux planetary gear sets PG1 and PG2 are disposed in a sequence of the first ravingneaux planetary gear set PG1, and the second ravingneaux planetary gear set PG2.

According to the sixteenth exemplary embodiment of the present invention, the first long-pinion-side sun gear LS1 is the first variable input member, the first planet carrier PC1 is the first variable stopped member, the first short-pinion-side sun gear SS1 is the second variable stopped member, and the first ring gear R1 is the reduced speed output member.

In addition, the second long-pinion-side sun gear LS2 is the reduced speed input member, the second planet carrier PC2 is the second variable input member, the second short-pinion-side sun gear SS2 is the third variable input member, the second planet carrier PC2 is the third variable stopped member, and the second ring gear R2 is the shifted speed output member.

Operations, shifting processes, and formations of each speed of the power trains according to the second through sixteenth embodiments of the present invention are similar to those of the power train according to the first embodiment of the present invention, and may be easily obtained by a person of ordinary skill in the art based on the teachings herein. Thus, a detailed explanation thereof will be omitted.

According to exemplary embodiments of the present invention, eight forward speeds and two reverse speeds may be realized.

In addition, according to exemplary embodiments of the present invention, a skip up-shifting and a skip down-shifting may be facilitated by reducing frictional members engaged or released in a skip shifting process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
an input shaft;
an output gear;
a transmission case;
a speed reduction unit comprising a first variable input member that is variably connected to the input shaft, first and second variable stopped members that are variably stopped by being variably connected to the transmission case, and a reduced speed output member that outputs first and second reduced rotational speeds;
an output unit comprising a reduced speed input member that is fixedly connected to the reduced speed output member, second and third variable input members that are variably connected to the input shaft, a third variable stopped member that is variably stopped by being variably connected to the transmission case, and a shifted speed output member that always acts as an output element by being fixedly connected to the output gear, wherein the output unit generates eight forward speeds and two reverse speeds at the shifted speed output member by operations of the reduced speed input member, the second and third variable input members, and the third variable stopped member;

a first clutch for variably connecting the first variable input member to the input shaft;

a second clutch for variably connecting the second variable input member to the input shaft;

a third clutch for variably connecting the third variable input member to the input shaft;

a first brake for variably stopping the third variable stopped member;

a second brake for variably stopping the first variable stopped member;

a third brake for variably stopping the second variable stopped member; and a one-way clutch disposed between the third variable stopped member and the transmission case in parallel with the first brake;

wherein the speed reduction unit comprises a ravingneaux planetary gear set comprising a ravingneaux ring gear, a ravingneaux planet carrier, a long-pinion-side sun gear, and a short-pinion-side sun gear;

wherein the short-pinion-side sun gear is the first variable input member;

the ravingneaux planet carrier is the first variable stopped member;

the long-pinion-side sun gear is the second variable stopped member; and the ravingneaux ring gear is the reduced speed output member.

2. The power train of claim 1, wherein the output unit comprises:
 a first planetary gear set comprising a first sun gear, a first planet carrier, and a first ring gear; and
 a second planetary gear set comprising a second sun gear, a second planet carrier, and a second ring gear;
 wherein the first ring gear is the reduced speed input member;
 the second sun gear is the second variable input member;
 the first planet carrier is the third variable input member;
 the second ring gear is the third variable stopped member;
 the second planet carrier is the shifted speed output member;
 the first sun gear is fixedly connected to the second sun gear; and
 the first planet carrier is fixedly connected to the second ring gear.

3. The power train of claim 1, wherein the input shaft and the output gear are both disposed at a first side of the power train.

4. The power train of claim 1, wherein the ravingneaux planetary gear set and the first and second planetary gear sets are disposed in a sequence of the ravingneaux planetary gear set, the first planetary gear set, and the second planetary gear set.

5. The power train of claim 1, wherein the first and third clutches are disposed between the speed reduction unit and the output unit, and the second clutch is disposed opposite the speed reduction unit with reference to the output unit.

6. The power train of claim 1, wherein the second and third brakes are disposed opposite the first brake with reference to the speed reduction unit.

7. The power train of claim 1, wherein:
 the second clutch, the third brake, and the one-way clutch are operated in a first forward speed;
 the second clutch and the second and third brakes are operated in a second forward speed;
 the first and second clutches and the second brake are operated in a third forward speed;
 the first and second clutches and the third brake are operated in a fourth forward speed;
 the first, second, and third clutches are operated in a fifth forward speed;
 the first and third clutches and the third brake are operated in a sixth forward speed;
 the first and third clutches and the second brake are operated in a seventh forward speed;
 the third clutch and the second and third brakes are operated in an eighth forward speed;
 the first clutch and the first and second brakes are operated in a first reverse speed; and
 the first clutch and the first and third brakes are operated in a second reverse speed.

8. The power train of claim 1, wherein the output unit comprises:
 a first planetary gear set comprising a first sun gear, a first planet carrier, and a first ring gear; and
 a second planetary gear set comprising a second sun gear, a second planet carrier, and a second ring gear;
 wherein the first sun gear is the reduced speed input member;
 the second sun gear is the second variable input member;
 the first planet carrier is the third variable input member;
 the first planet carrier and the second ring gear are fixedly connected to each other and act as the third variable stopped member;
 the second planet carrier is the shifted speed output member; and
 the first ring gear is fixedly connected to the second planet carrier.

9. The power train of claim 8, wherein the input shaft and the output gear are both disposed at a first side of the power train.

10. The power train of claim 8, wherein the ravingneaux planetary gear set and the first and second planetary gear sets are disposed in a sequence of the ravingneaux planetary gear set, the first planetary gear set, and the second planetary gear set.

11. The power train of claim 8, wherein the first and third clutches are disposed between the speed reduction unit and the output unit, and the second clutch is disposed opposite the speed reduction unit with reference to the output unit.

12. The power train of claim 8, wherein the second and third brakes are disposed opposite the first brake with reference to the speed reduction unit.

13. The power train of claim 8, wherein:
 the second clutch, the third brake, and the one-way clutch are operated in a first forward speed;
 the second clutch and the second and third brakes are operated in a second forward speed;
 the first and second clutches and the second brake are operated in a third forward speed;
 the first and second clutches and the third brake are operated in a fourth forward speed;
 the first, second, and third clutches are operated in a fifth forward speed;

the first and third clutches and the third brake are operated in a sixth forward speed;

the first and third clutches and the second brake are operated in a seventh forward speed;

the third clutch and the second and third brakes are operated in an eighth forward speed;

the first clutch and the first and second brakes are operated in a first reverse speed; and the first clutch and the first and third brakes are operated in a second reverse speed.

* * * * *